United States Patent
Zhao et al.

(10) Patent No.: US 10,216,030 B2
(45) Date of Patent: Feb. 26, 2019

(54) COLOR FILTER ON ARRAY TYPE LIQUID CRYSTAL PANEL AND MANUFACTURING METHOD FOR THE SAME

(71) Applicant: SHENZHEN CHINA STAR OPTOELECTRONICS TECHNOLOGY CO., LTD., Shenzhen (CN)

(72) Inventors: Yongchao Zhao, Shenzhen (CN); Chungching Hsieh, Shenzhen (CN); Xiang Li, Shenzhen (CN); Yanjun Song, Shenzhen (CN)

(73) Assignee: SHENZHEN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/778,745

(22) PCT Filed: Aug. 7, 2015

(86) PCT No.: PCT/CN2015/086355
§ 371 (c)(1),
(2) Date: Sep. 21, 2015

(87) PCT Pub. No.: WO2017/012151
PCT Pub. Date: Jan. 26, 2017

(65) Prior Publication Data
US 2018/0120629 A1  May 3, 2018

(30) Foreign Application Priority Data

Jul. 17, 2015  (CN) .......................... 2015 1 0422650

(51) Int. Cl.
*G02F 1/1335* (2006.01)
*G02F 1/1337* (2006.01)
(Continued)

(52) U.S. Cl.
CPC ........ *G02F 1/133514* (2013.01); *G02F 1/137* (2013.01); *G02F 1/1337* (2013.01);
(Continued)

(58) Field of Classification Search
None
See application file for complete search history.

(56) References Cited

U.S. PATENT DOCUMENTS

| 2012/0015115 A1* | 1/2012 | Lin ........................ C09K 19/02 428/1.2 |
| 2014/0213137 A1* | 7/2014 | Miyake ................. G02F 1/1339 445/25 |

(Continued)

FOREIGN PATENT DOCUMENTS

| CN | 103064217 A | 4/2013 |
| CN | 103525429 A | 1/2014 |

(Continued)

*Primary Examiner* — Ryan Crockett
(74) *Attorney, Agent, or Firm* — Emerson, Thomson & Bennett, LLC; Roger D. Emerson

(57) ABSTRACT

A color-filter-on-array (COA) type liquid crystal panel and a manufacturing method thereof are disclosed. An alignment film in the COA type liquid crystal panel is formed by a photo-alignment technology of an ultraviolet induced multi-domain vertical alignment (UV²A). Also, a problem of image sticking of an existing COA type liquid crystal display is improved by controlling the dielectric constant (Δε) of the liquid crystal molecules of a liquid crystal layer in the COA type liquid crystal panel.

10 Claims, 4 Drawing Sheets

(51) Int. Cl.
*G02F 1/137* (2006.01)
*G02F 1/1339* (2006.01)
*G02F 1/1362* (2006.01)

(52) U.S. Cl.
CPC .... *G02F 1/13394* (2013.01); *G02F 1/133512* (2013.01); *G02F 1/133788* (2013.01); *G02F 2001/13712* (2013.01); *G02F 2001/136222* (2013.01)

(56) References Cited

U.S. PATENT DOCUMENTS

| | | |
|---|---|---|
| 2015/0163968 A1 | 6/2015 | Lee et al. |
| 2016/0306236 A1 | 10/2016 | Iwashita et al. |
| 2016/0319191 A1 | 11/2016 | Hirata et al. |
| 2017/0235192 A1* | 8/2017 | Miyake ............ G02F 1/133788 445/25 |
| 2017/0261816 A1* | 9/2017 | Zhao ................ G02F 1/133753 |
| 2017/0355906 A1* | 12/2017 | Taniguchi .............. C09K 19/12 |
| 2018/0039109 A1* | 2/2018 | Li ........................ G02F 1/1337 |
| 2018/0252961 A1* | 9/2018 | Peng ..................... G02F 1/1335 |

FOREIGN PATENT DOCUMENTS

| | | |
|---|---|---|
| CN | 104730770 A | 6/2015 |
| WO | 2014203567 A1 | 12/2014 |
| WO | 2015064629 A1 | 5/2015 |

* cited by examiner

COLOR FILTER ON ARRAY TYPE LIQUID CRYSTAL PANEL AND MANUFACTURING METHOD FOR THE SAME

BACKGROUND OF THE INVENTION

1. Field of the Invention

The present invention relates to a liquid crystal (LC) panel and manufacturing method thereof, and more specifically to a color-filter-on-array (COA) type LC panel and manufacturing method thereof.

2. Description of the Prior Art

A COA type liquid crystal display (LCD) is an LCD having a color filter and thin film transistor (TFT) arrays disposed on the same substrate. In addition to an aperture ratio being effectively improved, the COA type LCD can further solve an alignment problem which occurs in a large-sized panel, as well as decreases current leakage being generated from a light exposure; and thus COA technology is applicable to a display of the large-sized panel.

However, since the dielectric constant ($\Delta\varepsilon$) of the LC molecules of an LC layer in the COA type LCD is now designed to be very large by many research institutions in order to enhance the optical performances such as response time and the like of the COA type LCD (the dielectric constant is increased mainly by increasing the proportion of a polar LC monomer, but the increase of the polar LC monomer leads to the decrease of the stability of the LC molecules), the LC molecules are easily deteriorated during an operation to generate removable ions, so that the voltage holding ratio (VHR) thereof is reduced, thereby leading to poor reliability (especially image sticking).

Therefore, there is a need to provide a COA type LC panel which can improve the problem of image sticking, so as to overcome the disadvantage in the prior art.

SUMMARY OF THE INVENTION

An object of the present invention is to provide a COA type LC panel and manufacturing method thereof. An alignment film in the COA type LC panel is formed by a photo-alignment technology of an ultraviolet induced multi-domain vertical alignment ($UV^2A$). Also, a problem of image sticking of an existing COA type LCD is improved by controlling the dielectric constant ($\Delta\varepsilon$) of the LC molecules of an LC layer in the COA type LC panel.

To achieve the above object, the present invention provides a COA type LC panel including:
a first substrate having a first alignment film, the first substrate comprising:
 a transparent substrate;
 a TFT array layer disposed on the transparent substrate; and
 a color filter layer disposed on the TFT array layer;
a second substrate having a second alignment film, the first substrate and the second substrate being opposite each other; and
an LC layer sandwiched between the first substrate and the second substrate, the LC layer being in contact with the first alignment film and the second alignment film, the LC layer including at least one polar LC monomer and at least one non-polar LC monomer. The first and second alignment films, which are made of a polarized light-sensitive material, are formed by a photo-alignment technology of an ultraviolet induced multi-domain vertical alignment ($UV^2A$).

In one exemplary embodiment of the present invention, the LC molecules of the LC layer are negative liquid crystals.

In one exemplary embodiment of the present invention, the LC molecules of the LC layer have a dielectric constant ($\Delta\varepsilon$) between −2.1 and −2.5 at 20° C.

In one exemplary embodiment of the present invention, the polarized light-sensitive material is a polyimide material.

In one exemplary embodiment of the present invention, the polyimide material has a responsive wavelength of 313 nm.

In one exemplary embodiment of the present invention, the polyimide material has an alignment group including cinnamic acid or coumarin.

Furthermore, the present invention further provides a method for manufacturing a COA type LC panel. The method includes the following steps of:
providing a first substrate comprising a transparent substrate, a TFT array layer disposed on the transparent substrate, and a color filter layer disposed on the TFT array layer;
providing a second substrate;
coating a polarized light-sensitive material onto the first substrate and the second substrate, respectively, and then correspondingly forming a first alignment film and a second alignment film by a photo-alignment technology of an ultraviolet induced multi-domain vertical alignment ($UV^2A$); and
providing at least one polar LC monomer and at least one non-polar LC monomer, mixing the polar LC monomer and the non-polar LC monomer, and then filling the mixed polar and non-polar LC monomers between the first substrate and the second substrate, forming an LC layer. The LC layer is in contact with the first alignment film and the second alignment film.

In one exemplary embodiment of the present invention, the LC molecules of the LC layer are negative liquid crystals.

In one exemplary embodiment of the present invention, the LC molecules of the LC layer have a dielectric constant ($\Delta\varepsilon$) between −2.1 and −2.5 at 20° C.

In one exemplary embodiment of the present invention, the polarized light-sensitive material is a polyimide material.

In one exemplary embodiment of the present invention, the polyimide material has a responsive wavelength of 313 nm.

In one exemplary embodiment of the present invention, the polyimide material has an alignment group including cinnamic acid or coumarin.

The present invention has obvious advantages and beneficial effects over the prior art. The COA type LC panel and manufacturing method thereof of the present invention according to the above technical scheme has at least the following advantages and beneficial effects. The alignment film in the COA type LC panel is formed by the photo-alignment technology of the ultraviolet induced multi-domain vertical alignment ($UV^2A$). Also, the problem of image sticking of the existing COA type LCD is improved by controlling the dielectric constant ($\Delta\varepsilon$) of the LC molecules of the LC layer in the COA type LC panel.

Figure 1:
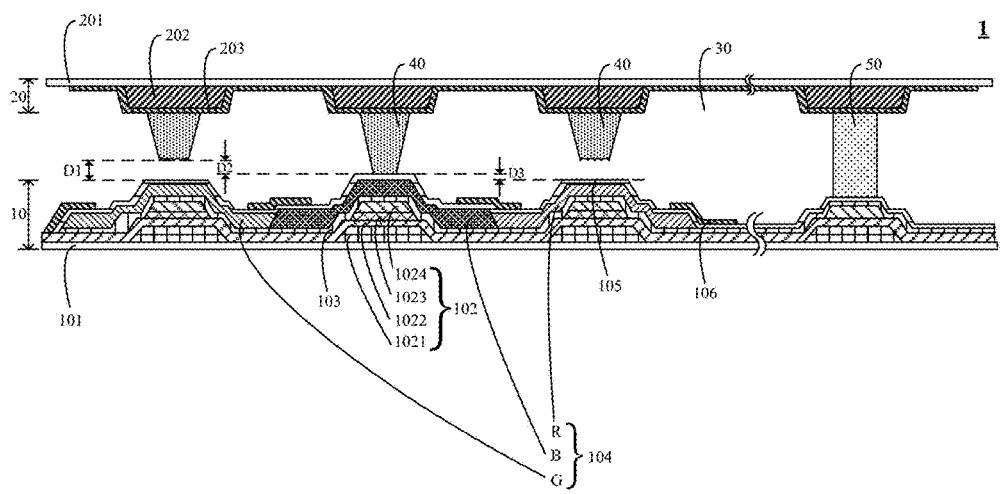
FIG. 1 is a schematic view of a structure of a COA type LC panel according to one embodiment of the present invention.

| REFERENCE NUMERALS IN DRAWINGS | |
|---|---|
| 1 | COA type LC panel |
| 10 | first substrate |
| 20 | second substrate |
| 30 | LC layer |
| 40 | spacer |
| 50 | sealant |
| 101 | first transparent substrate (or transparent substrate) |
| 102 | TFT array layer |
| 103 | first protection layer |
| 104 | color filter layer |
| 105 | second protection layer |
| 106 | first transparent conductive film |
| 201 | second transparent substrate |
| 202 | black matrix layer |
| 203 | second transparent conductive film |
| 1021 | Mo/Al |
| 1022 | G-SiNx |
| 1023 | a-Si |
| 1024 | MoN/Al/Mo |
| R | red sub-pixel |
| G | green sub-pixel |
| B | blue sub-pixel |
| D1 | gap |
| D2 | height difference between spacers |
| D3 | thickness difference between B and R (or G) |
| S11-S14 | steps |

DETAILED DESCRIPTION OF THE PREFERRED EMBODIMENTS

Various preferred embodiments are now described with reference to the accompanying drawings. In the following description, for purposes of explanation, numerous specific details are set forth in order to provide a thorough understanding of a COA type LC panel and manufacturing method thereof, and its specific embodiment, structure, features, and functions.

Please refers to FIG. 1 which is a schematic view of a structure of a COA type LC panel 1 according to one embodiment of the present invention. The COA type LC panel 1 includes a first substrate 10, a second substrate 20, an LC layer 30, and a plurality of spacers 40. The first substrate 10 and the second substrate 20 are opposite each other, and the LC layer 30 is sandwiched between the first substrate 10 and the second substrate 20. The inner surface of the first substrate 10 has a first alignment film thereon (not shown in the figure). The inner surface of the second substrate 20 has a second alignment film thereon (not shown in the figure). The LC layer 30 is in contact with the first alignment film and the second alignment film.

The first substrate 10 includes a first transparent substrate 101, a TFT array layer 102, a first protection layer 103, a color filter layer 104, a second protection layer 105, and a plurality of first transparent conductive films 106. The TFT array layer 102 is disposed on the inner surface of the first transparent substrate 101. The first protection layer 103 is disposed on the TFT array layer 102. The color filter layer 104 is disposed on the first protection layer 103. The second protection layer 105 is disposed on the color filter layer 104. The first transparent conductive films 106 are disposed on the second protection layer 105.

The second substrate 20 includes a second transparent substrate 201, a black matrix layer 202, and a second transparent conductive film 203. The black matrix layer 202 is disposed on the inner surface of the second transparent substrate 201. The second transparent conductive film 203 is disposed on the black matrix layer 202. The spacers 40 are disposed between the color filter layer 104 and the black matrix layer 202.

The LC layer 30 includes at least one polar LC monomer and at least one non-polar LC monomer. The LC molecules of the LC layer 30 are negative liquid crystals. The LC molecules of the LC layer 30 have a dielectric constant ($\Delta\varepsilon$) between −2.1 and −2.5 at 20° C.

The first and second alignment films, which are made of a polarized light-sensitive material, are formed by a photo-alignment technology of an ultraviolet induced multi-domain vertical alignment ($UV^2A$). The polarized light-sensitive material is a polyimide material having a responsive wavelength of 313 nm. The polyimide material has an alignment group including cinnamic acid or coumarin.

Figure 2:
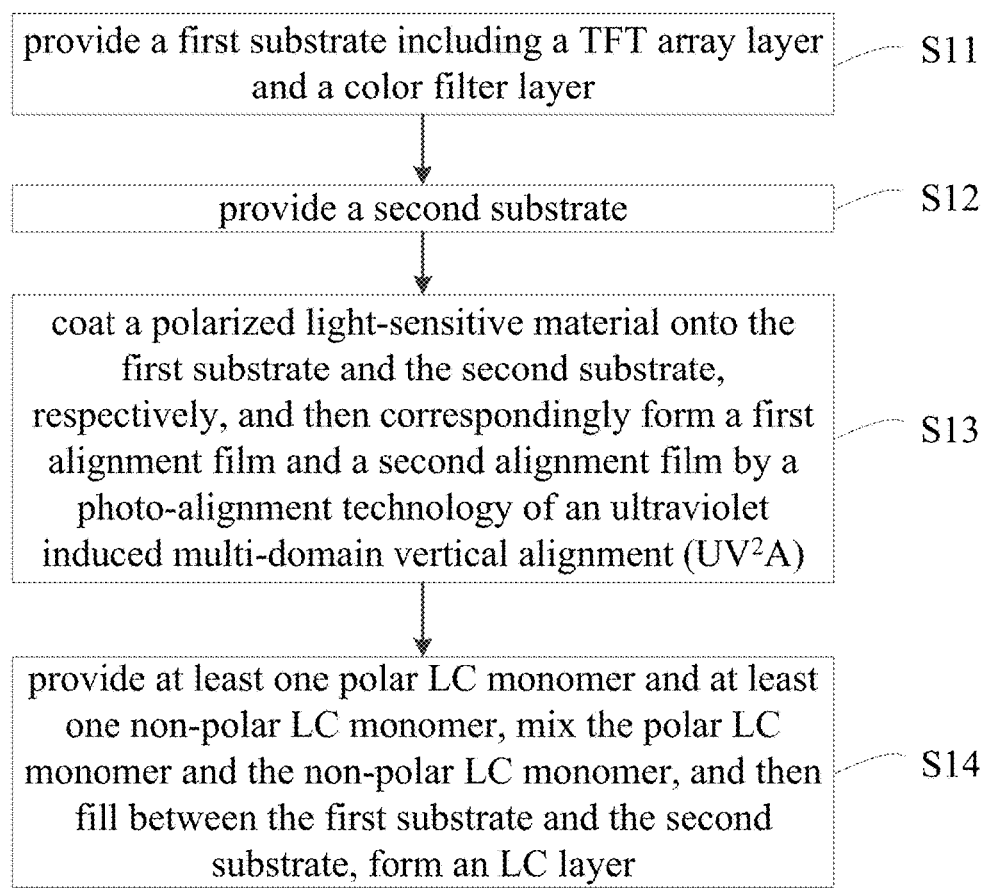
FIG. 2 is a flow chart of a method according to one embodiment of the present invention for manufacturing a COA type LC panel.

Please refer to FIG. 2, which is a flow chart of a method according to one embodiment of the present invention for manufacturing a COA type LC panel 1. The method includes the following steps S11-S14.

In step S11, a first substrate 10 is provided. The first substrate 10 includes a transparent substrate 101, a TFT array layer 102 disposed on the transparent substrate 101, and a color filter layer 104 disposed on the TFT array layer 102.

In step S12, a second substrate 20 is provided.

Figure 3:
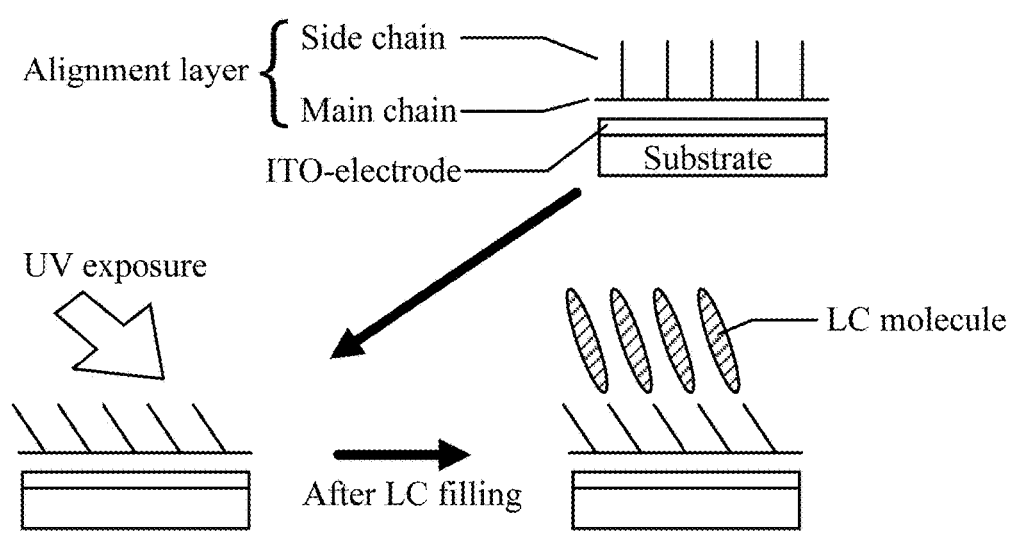
FIG. 3 is a schematic view of a photo-alignment technology of an ultraviolet induced multi-domain vertical alignment ($UV^2A$)

In step S13, a polarized light-sensitive material is coated on the first substrate 10 and the second substrate 20, respectively, and then a first alignment film and a second alignment film (not shown in the figure) are correspondingly formed by a photo-alignment technology of an ultraviolet induced multi-domain vertical alignment ($UV^2A$). The polarized light-sensitive material is a polyimide material having a responsive wavelength of 313 nm. The polyimide material has an alignment group including cinnamic acid or coumarin. The specific feature of the photo-alignment technology of the ultraviolet induced multi-domain vertical alignment ($UV^2A$) is that a polarized ultraviolet light is obliquely irradiated onto an alignment film, so that the alignment film is inclined along the incident direction of the polarized ultraviolet light. That is, the alignment direction of the alignment film can be controlled by controlling the directions of different incident lights, thereby the tilt direction of LC molecules is controlled, as shown in FIG. 3.

In step S14, at least one polar LC monomer and at least one non-polar LC monomer are provided. The polar LC monomer and the non-polar LC monomer are mixed, and then are filled between the first substrate 10 and the second substrate 20 to form an LC layer 30. The LC layer 30 is in contact with the first alignment film and the second alignment film. The LC molecules of the LC layer 30 are negative liquid crystals. The LC molecules of the LC layer have a dielectric constant ($\Delta\varepsilon$) between −2.1 and −2.5 at 20° C.

The COA type LC panel of the invention can be manufactured by executing above steps S11-S14.

Please refer to Table 1, which shows the dielectric constants ($\Delta\varepsilon$) of different LC compositions according to specific embodiments of the present invention. A liquid crystal mixture LC-1 having monomers A-C and a-d has a dielectric constant ($\Delta\varepsilon$) of −3.5. A liquid crystal mixture LC-2 having monomers A-E and a-b has a dielectric constant ($\Delta\varepsilon$) of −2.7.

A liquid crystal mixture LC-3 having monomers A-C, E, a-b, and d has a dielectric constant (Δε) of −2.1. Therefore, it can be known that different dielectric constants (Δε) can be obtained by changing monomers in a liquid crystal mixture (i.e., the selection of different polar LC monomers and different non-polar LC monomers). In addition, the dielectric constant (Δε) can also be controlled by adjusting the content of the monomer.

TABLE 1

| items | monomer | LC-1 | LC-2 | LC-3 |
|---|---|---|---|---|
| non-polar | A | Y | Y | Y |
|  | B | Y | Y | Y |
|  | C | Y | Y | Y |
|  | D | — | Y | — |
|  | E | — | Y | Y |
| polar | a | Y | Y | Y |
|  | b | Y | Y | Y |
|  | c | Y | — | — |
|  | d | Y | — | Y |
| dielectric constant |  | −3.5 | −2.7 | −2.1 |

Figure 4:
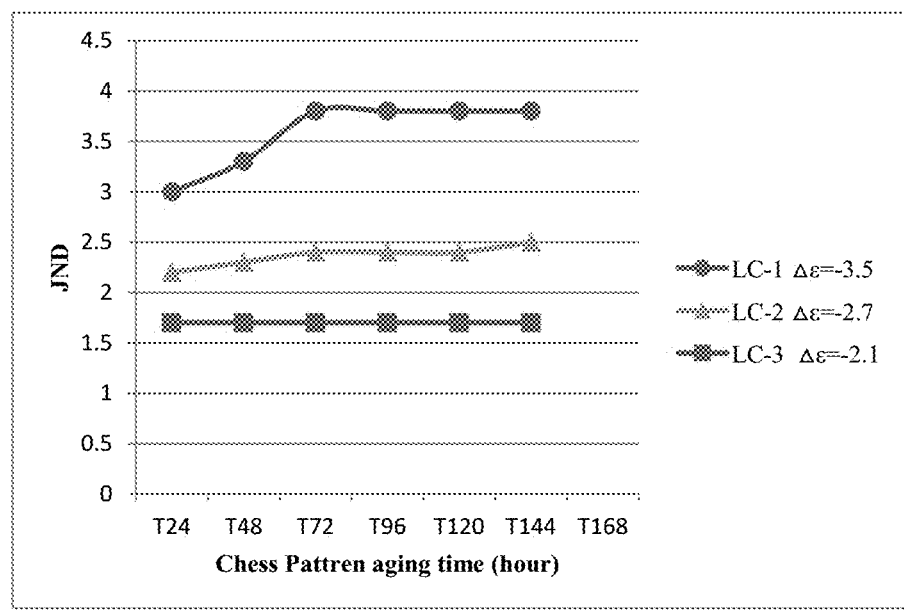
FIG. 4 shows image sticking results of the different LC compositions of Table 1.

Please refer to FIG. 4, which shows image sticking results of the different LC compositions of Table 1, and JND of different times are shown therein. The inexistence of JND is expressed as 1.7, which is best. The higher the value of JND, the worse the image sticking. From FIG. 4, it can be observed that the image sticking becomes increasingly better with the increase of the dielectric constant (Δε). Therefore, it can be known that the image sticking of the LC panel can be improved by controlling the dielectric constant (Δε) of the LC molecules.

As mentioned above, in the COA type LC panel and manufacturing method thereof of the present invention, the alignment film in the COA type LC panel is formed by the photo-alignment technology of the ultraviolet induced multi-domain vertical alignment (UV$^2$A), and a problem of image sticking of the existing COA type LCD is improved by controlling the dielectric constant (Δε) of the LC molecules of the LC layer in the COA type LC panel.

The above description of the invention is intended to be illustrative and not limiting. Various changes or modifications in the embodiments described may occur to those skilled in the art. These can be achieved without departing from the spirit or scope of the invention.

What is claimed is:

1. A color-filter-on-array (COA) type liquid crystal panel, comprising:
   a first substrate having a first alignment film, the first substrate comprising:
      a transparent substrate;
      a thin-film transistor (TFT) array layer disposed on the transparent substrate; and
      a color filter layer disposed on the thin-film transistor array layer;
   a second substrate having a second alignment film, the first substrate and the second substrate being opposite each other; and
   a liquid crystal layer sandwiched between the first substrate and the second substrate, the liquid crystal layer being in contact with the first alignment film and the second alignment film, the liquid crystal layer comprising at least one polar liquid crystal monomer and at least one non-polar liquid crystal monomer, wherein the liquid crystal molecules of the liquid crystal layer have a dielectric anisotropy (Δε) between −2.1 and −2.5 at 20° C.,
   wherein the first and second alignment films, which are made of a polarized light-sensitive material, are formed by a photo-alignment technology of an ultraviolet induced multi-domain vertical alignment (UV$^2$A).

2. The color-filter-on-array type liquid crystal panel of claim 1, wherein liquid crystal molecules of the liquid crystal layer are negative liquid crystals.

3. The color-filter-on-array type liquid crystal panel of claim 1, wherein the polarized light-sensitive material is a polyimide material.

4. The color-filter-on-array type liquid crystal panel of claim 3, wherein the polyimide material has a responsive wavelength of 313 nm.

5. The color-filter-on-array type liquid crystal panel of claim 3, wherein the polyimide material has an alignment group comprising cinnamic acid or coumarin.

6. A method for manufacturing a color-filter-on-array (COA) type liquid crystal panel, comprising the following steps of:
   providing a first substrate comprising a transparent substrate, a thin film transistor array layer disposed on the transparent substrate, and a color filter layer disposed on the thin film transistor array layer;
   providing a second substrate;
   coating a polarized light-sensitive material onto the first substrate and the second substrate, respectively, and then correspondingly forming a first alignment film and a second alignment film by a photo-alignment technology of an ultraviolet induced multi-domain vertical alignment (UV$^2$A); and
   providing at least one polar liquid crystal monomer and at least one non-polar liquid crystal monomer, mixing the polar liquid crystal monomer and the non-polar liquid crystal monomer, and then filling the mixed polar and non-polar liquid crystal monomers between the first substrate and the second substrate, forming a liquid crystal layer, wherein the liquid crystal layer is in contact with the first alignment film and the second alignment film, and the liquid crystal molecules of the liquid crystal layer have a dielectric anisotropy (Δε) between −2.1 and −2.5 at 20° C.

7. The method for manufacturing the color-filter-on-array type liquid crystal panel of claim 6, wherein liquid crystal molecules of the liquid crystal layer are negative liquid crystals.

8. The method for manufacturing the color-filter-on-array type liquid crystal panel of claim 6, wherein the polarized light-sensitive material is a polyimide material.

9. The method for manufacturing the color-filter-on-array type liquid crystal panel of claim 8, wherein the polyimide material has a responsive wavelength of 313 nm.

10. The method for manufacturing the color-filter-on-array type liquid crystal panel of claim 8, wherein the polyimide material has an alignment group comprising cinnamic acid or coumarin.

* * * * *